F. ZAGELMEYER.
CAMPING OUTFIT.
APPLICATION FILED MAY 7, 1918. RENEWED MAY 16, 1919.
1,308,139.
Patented July 1, 1919.
2 SHEETS—SHEET 2.
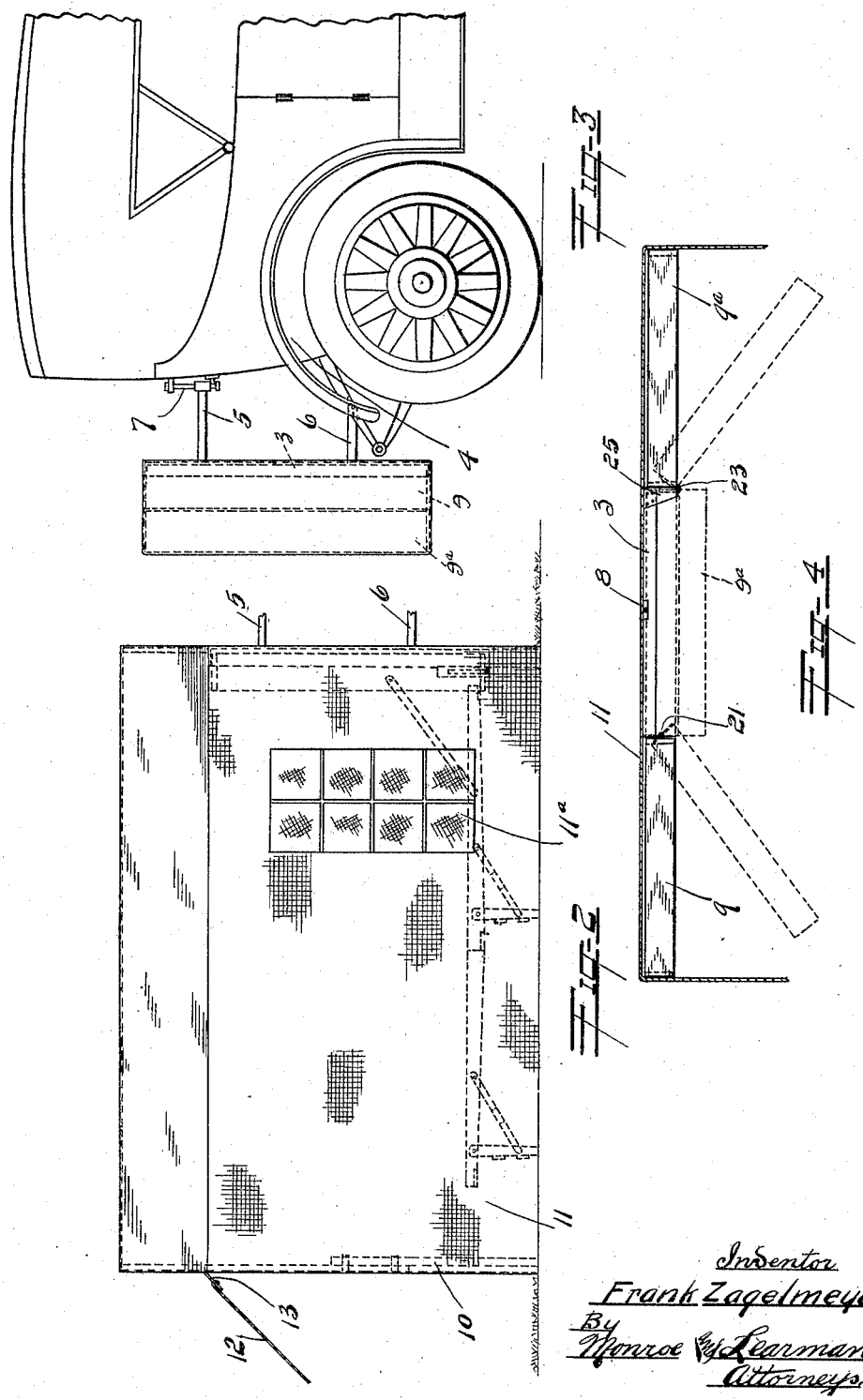

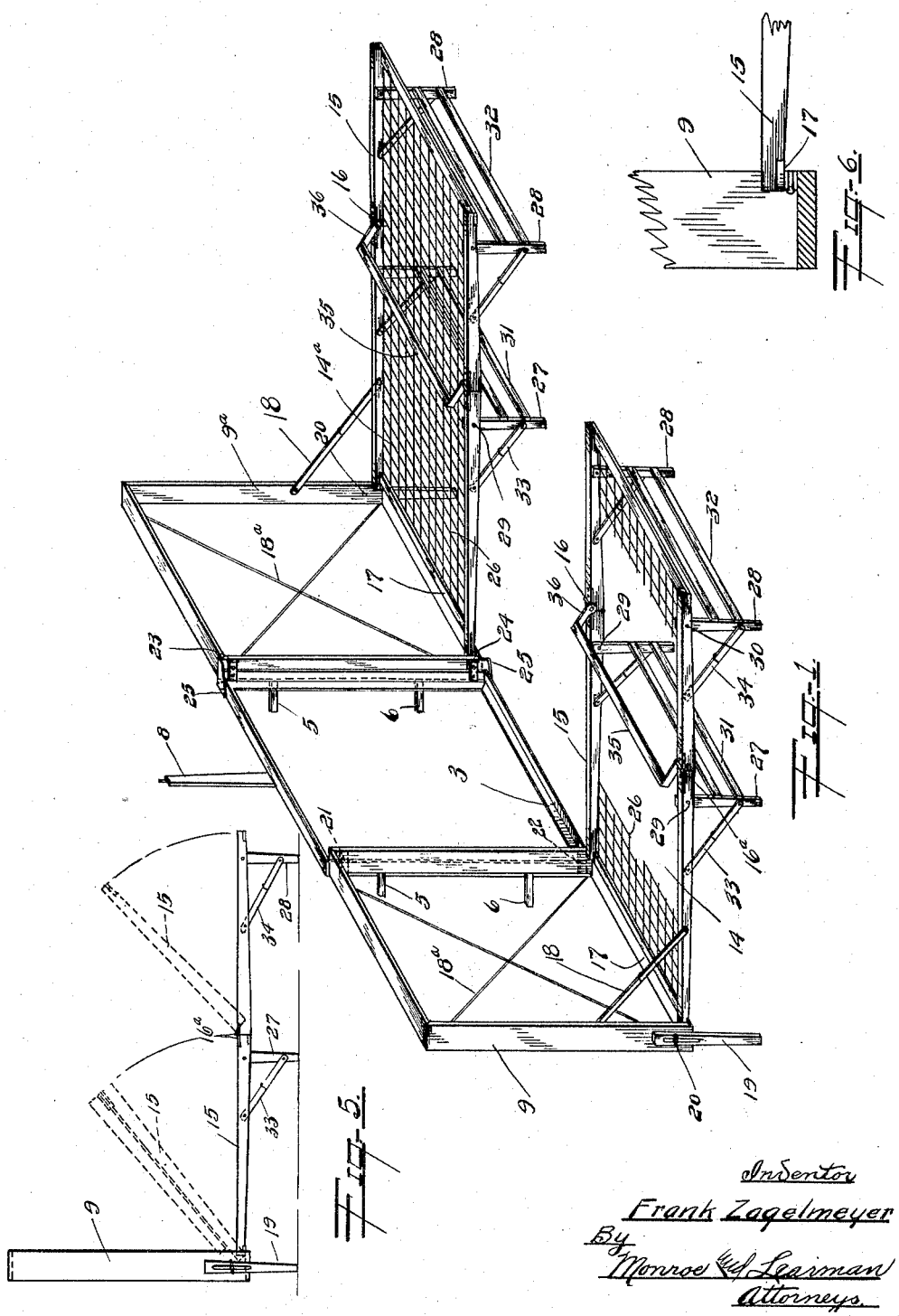

UNITED STATES PATENT OFFICE.

FRANK ZAGELMEYER, OF BAY CITY, MICHIGAN.

CAMPING OUTFIT.

1,308,139. Specification of Letters Patent. Patented July 1, 1919.

Application filed May 7, 1918, Serial No. 233,062. Renewed May 16, 1919. Serial No. 297,567.

*To all whom it may concern:*

Be it known that I, FRANK ZAGELMEYER, a citizen of the United States of America, residing at Bay City, in the county of Bay and State of Michigan, have invented certain new and useful Improvements in Camping Outfits, of which the following is a specification.

This invention relates to camping outfits. The object of the present invention is to provide a simple and practical camping outfit adapted to be readily attached to an automobile or other vehicle, which can be compactly folded and is adapted to be readily arranged for use.

A further object of the invention is to provide a camping outfit equipped with a tent and two foldable berths arranged to unfold into the tent, one end of which is supported by the automobile in such manner as to permit the tent and berths to be quickly and easily arranged for use.

With the above and other objects in view, the present invention consists in the combination and arrangement of parts hereinafter more fully described, illustrated in the accompanying drawings, and more particularly pointed out in the appended claims, it being understood that changes may be made in the form, size, proportion and minor details without departing from the spirit or sacrificing any of the advantages of the invention.

In the drawings:—

Figure 1 is an isometric view of a portion of the camping outfit, the foldable berths being shown in an open position.

Fig. 2 is a side elevation showing the tent pitched for camping.

Fig. 3 is a side elevation showing the outfit folded and attached to the rear of an automobile.

Fig. 4 is a plan view showing the berths folded into the case and the method of folding the cases with relation to each other.

Fig. 5 is a side view showing the manner of folding each berth.

Fig. 6 is a detail showing the method of hinging the berths to the case.

In the accompanying drawings in which is illustrated the preferred embodiment of my invention, the camping outfit comprises in its construction a frame 3 which I prefer to make of light angle iron designed to be attached to the body of an automobile 4 by upper and lower members 5 and 6, the lower member 6 being preferably connected to the springs or other suitable portion of the automobile at the lower portion thereof, the upper members 5 being suitably secured to the member 7 with which every automobile is usually equipped. Both upper and lower members are horizontally arranged, and they may be bolted or attached to the frame in any suitable manner.

Pivotally attached to the upper portion of the frame member 3 is the vertically disposed arm or member 8, which is adapted to serve as a support for the forward peak of the tent 11 when it is pitched, the forward corners of said tent being carried on the outer upper corners of the members comprising the cases 9 and 9ª in a manner to be hereinafter explained, it will thus be evident that the automobile is adapted to form a support for the forward end of the tent.

The rear portion of the tent is supported by the adjustable poles 10, which are pointed at their tops to fit into suitable gromets in the tent, and which are composed of upper and lower relatively adjustable or telescopic sections provided with means for securing them in their adjusted positions, and for enabling the poles to be lengthened or shortened as required. The tent is also provided at opposite sides with windows or openings 11ª designed to be covered with a loosely woven material to permit a free circulation of air through the tent so that perfect ventilation will be afforded. The flap or outlet of the tent is located at the rear thereof, and bracing or guy ropes 12 are connected with and extend outwardly from the rear of the tent, the guy ropes 12 being connected to the tent adjacent the rear supporting poles 10 to the flap 13, the lower ends being secured to stakes driven in the ground in the usual manner.

The camping outfit is provided with berths 14 and 14ª constructed substantially the same, and composed of side members 15 and suitable transverse connecting bars or members, these members 15 are split intermediate their length, and are hinged together at their upper edges by the hinge members 16 and 16ª, and when extended for use as illustrated in Fig. 1 of the drawings, their upper edges are horizontal and are arranged in alinement while their lower edges are slightly oppositely inclined.

The side bars or members 15 are connected at their forward ends by suitable transverse members 17 which are hinged to the case members 9 and 9ª, said case members being composed of top, bottom and side members securely fastened together, and when the berths are in open position are braced thereto by means of the foldable braces 18, the cases being further braced by suitable means such as wires 18ª extending diagonally thereof as clearly shown in Fig. 1, the berths being designed to fold upwardly and into the cases as illustrated in Fig. 5. These cases are at their inner edges supported by and pivoted to the frame members 3 by hinges or other suitable means, the outer edge being supported by an adjustable leg 19 provided with a slot which is designed to slide on the bolt member 20, and, when the berths are folded for travel these legs are turned upwardly and securely held against the side of the case.

In order that the cases may be in direct transverse alinement when the tent is pitched for camping, which is essential inasmuch as the forward corners of the tent are supported by the outer upper corners of the cases, I pivot the case member 9 by means of upper and lower hinge members 21 and 22 at a point approximately in the vertical center of the inner side member, the opposite case member 9ª being pivoted at its edge most remote from the frame 3 at the points 23 and 24 and, as this case is pivoted at a greater distance from the frame I provide the brace 25 which is riveted to the frame and the hinges secured thereto. It will therefore be evident that when the camping outfit is in the opened position the cases will be in direct transverse alinement, and when closed will compactly fold one against the other.

The berths are designed to fold upwardly and inwardly into the case as clearly shown in Fig. 5 where they are securely held by means of a hook and eye attachment leaving the floor area of the tent free for any desired purpose. When folding the outfit for travel the adjustable poles at the rear of the tent are removed and the pivoted upstanding member 8 is allowed to swing downwardly, the tent is then folded inwardly, the case member 9 swung inwardly against and into the frame member 3, the opposite case member 9ª being also swung inwardly and against the case 9 in a similar manner in which position they are hooked together and covered with a suitable cover as shown in Fig. 3.

The berths are equipped with springs 26 attached to the transverse connecting members which are located at the ends of the berths, each section being also provided with supporting legs 27 and 28 pivoted at their upper ends 29 and 30 to the side members 15 and connected by the transverse members 31 and 32, these legs are also braced and held in position by the common knife braces 33 and 34, and are provided with means such as a hook and eye for securing them in position when folded against the inner sections of the side members when the berths are folded.

In order that the springs and bed clothing may be held in the proper position when the berths are folded, the berths are equipped with a yoke or clamp member 35 extending across the central portion of the berths and having resilient sides or arm members 36 which will enable them to be sprung into and out of engagement with the pintles of the hinges of the sections of the side members of the berths, as these yokes must be removed when the berths are arranged for use.

It will therefore be obvious that I have perfected a camping outfit equipped with two berths arranged to swing outwardly and to unfold inwardly into the tent, which can be easily and quickly assembled and which can be readily attached to an automobile.

What I claim is:

1. A camping outfit including a support, a pair of cases hinged to said support, berths hinged to the said cases and foldable within the same.

2. A camping outfit including a support designed to be mounted on an automobile or other vehicle, a pair of cases hinged to said support, berths hinged to said cases and foldable within the same.

3. A camping outfit including a support designed to be mounted on an automobile or other vehicle and consisting of an open frame or casing, a pair of cases hinged to the support and foldable against each other.

4. A camping outfit including a support designed to be mounted on an automobile or other vehicle, a pair of berth retaining cases hinged to the support and adapted to swing inwardly one against the other, one of the cases being received within the support.

5. A camping outfit including a support designed to be mounted on an automobile or other vehicle, a pair of cases hinged to the support and arranged to swing horizontally to fold them against the support, berths composed of inner and outer sections hinged together, legs carried by said sections, and means for holding them in their folded positions.

6. A camping outfit including a frame, a pair of cases hinged to the frame and arranged to swing horizontally to fold them against the frame, foldable berths hinged to the said cases at the bottom and arranged to swing vertically within the same and composed of inner and outer sections, the outer sections being foldable on the inner sections.

7. A camping outfit including a support designed to be mounted on an automobile or other vehicle, a pair of cases hinged to said support, one of said cases being hinged at its vertical center, the opposite case being hinged at its outer edge substantially as shown, to allow the cases to compactly fold one against the other.

8. A camping outfit including a support designed to be mounted on a automobile or other vehicle, a pair of cases hinged to the support and arranged to swing horizontally to fold them against the support, sectional berths hinged to said cases at the bottom, and arranged to swing vertically within the same.

9. A camping outfit including a support, designed to be mounted on an automobile or other vehicle, sectional berths hinged to the support and arranged to fold vertically, and to swing horizontally when folded to fold them against the support.

10. In a camping outfit, the combination of intermediate and lateral hingedly-connected frames adapted to be folded in superposed relation, a foldable berth carried by each lateral frame, means for attaching the intermediate frame to a motor vehicle for supporting the same, and supports for the lateral frames and the berths.

11. In a camping outfit, the combination of a plurality of hingedly-connected frames adapted to be folded in superposed relation, berths foldably mounted upon the frames and adapted to be folded into the same, means for supporting the frame upon a vehicle, and ground engaging means carried by the berths for supporting the same when extended.

In testimony whereof I affix my signature.

FRANK ZAGELMEYER.

Copies of this patent may be obtained for five cents each, by addressing the "Commissioner of Patents, Washington, D. C."